United States Patent [19]

Pekala et al.

[11] Patent Number: 5,731,360
[45] Date of Patent: Mar. 24, 1998

[54] COMPRESSION MOLDING OF AEROGEL MICROSPHERES

[75] Inventors: Richard W. Pekala, Pleasant Hill; Lawrence W. Hrubesh, Pleasanton, both of Calif.

[73] Assignee: Regents of the University of California, Oakland, Calif.

[21] Appl. No.: 610,921

[22] Filed: Mar. 5, 1996

[51] Int. Cl.$^6$ ............................ C08J 9/236; C08J 9/32
[52] U.S. Cl. ............................ 521/54; 521/181; 521/187; 521/136
[58] Field of Search ............................ 521/54, 181, 187, 521/136

[56] References Cited

U.S. PATENT DOCUMENTS

| | | | |
|---|---|---|---|
| 4,873,218 | 10/1989 | Pekala | 502/418 |
| 4,997,804 | 3/1991 | Pekala | 502/418 |
| 5,086,085 | 2/1992 | Pekala | 521/187 |
| 5,260,855 | 11/1993 | Kaschmitter et al. | 361/502 |
| 5,476,878 | 12/1995 | Pekala | 521/61 |
| 5,484,818 | 1/1996 | De Vos | 521/131 |

OTHER PUBLICATIONS

R.W. Pekala et al., "Carbon Aerogels: An Update on Structure, Properties, and Applications," Sol–Gel Processing and Applications, Plenum Press, N.Y., pp. 369–377, 1994.

*Primary Examiner*—Morton Foelak
*Attorney, Agent, or Firm*—L. E. Carnahan; Henry P. Sartorio

[57] ABSTRACT

An aerogel composite material produced by compression molding of aerogel microspheres (powders) mixed together with a small percentage of polymer binder to form monolithic shapes in a cost-effective manner. The aerogel composites are formed by mixing aerogel microspheres with a polymer binder, placing the mixture in a mold and heating under pressure, which results in a composite with a density of 50–800 kg/m$^3$ (0.05–0.80 g/cc). The thermal conductivity of the thus formed aerogel composite is below that of air, but higher than the thermal conductivity of monolithic aerogels. The resulting aerogel composites are attractive for applications such as thermal insulation since fabrication thereof does not require large and expensive processing equipment. In addition to thermal insulation, the aerogel composites may be utilized for filtration, ICF target, double layer capacitors, and capacitive deionization.

22 Claims, 2 Drawing Sheets

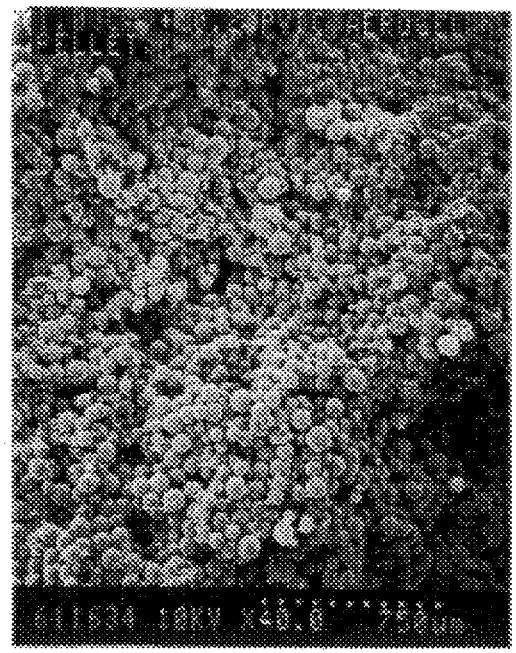 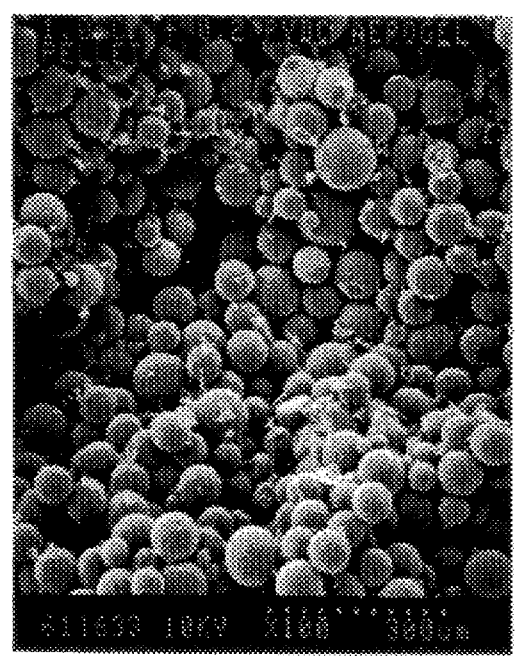
FIG. 1A                    FIG. 1B

COMPRESSION MOLDING OF AEROGEL MICROSPHERES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to organic aerogels, particularly to aerogel composites, and more particularly to compression molding of aerogel microspheres for the formation of aerogel composites.

The sol-gel polymerization of a multifunctional monomer in solution, leading to the formation of an aerogel, is not limited to metal alkoxides (e.g., tetramethoxy silane). Organic reactions that proceed through a sol-gel transition have been developed. Three proven synthetic routes for the formation of organic aerogels involve polycondensation of: 1) melamine with formaldehyde, U.S. Pat. No. 5,086,085 issued Feb. 4, 1992 to R. W. Pekala; 2) resorcinol with formaldehyde, U.S. Pat. Nos. 4,873,218 issued Oct. 10, 1989 and 4,997,804 issued Mar. 5, 1991, each to R. W. Pekala; and 3) phenolic with furfural, U.S. Pat. No. 5,476,878 issued Dec. 19, 1995 to R. W. Pekala, assigned to the same assignee. The latter two materials can also be pyrolyzed in an inert atmosphere to give carbon aerogels.

The structure and properties of aerogels are analogous to their inorganic counterparts. These materials have continuous porosity, an ultrafine cell/pore size (<50 nm), high surface area (400–1100 $m^2/g$), and a solid matrix composed of interconnected colloidal-like particles or fibrous chains with characteristic diameters of 10 nm. This structure is responsible for the unique thermal, acoustic, optical, electrical, and mechanical properties of organic aerogels. The organic aerogels, including carbon aerogel microspheres and carbon aerogel powders are also now finding use in various energy storage applications, exemplified by U.S. Pat. No. 5,260,855 issued Nov. 9, 1993 to J. L. Kaschmitter et al.; and copending application Ser. No. 08/440,168 filed May 12, 1995 by J. L. Kaschmitter et al. and assigned to the same assignee. Also see R. W. Pekala, Carbon Aerogels: An Update on Structure, Properties, and Applications, Sol-Gel Processing and Applications, edited by Y. A. Attia, Plenum Press, New York, 1994, pp. 369–377.

A major advantage of organic aerogels is their low Z (atomic number) composition. In general, most polymers have lower thermal conductivities than inorganic glasses, and this same trend would be expected for aerogels having such compositions. Recently, it has been shown that resorcinol-formaldehyde (RF) aerogels are even better thermal insulators than silica aerogels when measured under ambient conditions. See X. Lu et al., Science 255, 971 (1992). A record low therm-conductivity value of 0.012 W/m·K at a density of 0.16 g/cm$^3$ was obtained. In contrast, silica aerogels have a minimum thermal conductivity of 0.016 W/m·K under ambient conditions. These data demonstrate the importance of controlling both the composition and structure of aerogels.

Although monolithic aerogels, either supercritically-dried or air-dried, are ideal candidates for many applications (e.g., transparent window insulation), the large and expensive processing equipment necessary for producing reasonably-sized aerogels has limited the commercial application of this extraordinary material. The formation of aerogel microspheres or powders offers an attractive alternative to monolith production. A process for producing such aerogel microspheres or powders is described and claimed in copending U.S. application Ser. No. 08/089,119, filed Jul. 8, 1993 by Steven T. Mayer et al., now U.S. Pat. No. 5,508,341, issued Apr. 16, 1996, and assigned to the same assignee. The aerogel microspheres or powders can be produced in a semi-continuous process, and they can be used as loosely packed powders or as additives in conventional foaming operations to produce aerogel composites with superior acoustic and thermal properties. See R. W. Pekala et al., Organic Aerogel Microspheres, C&MS Annual Report, February 1995 and X. Lu et al., Correlation between Structure and Thermal Conductivity of Organic Aerogels, Report E21-0594-3 (1994).

While development efforts have been going forward to produce aerogel composites, a method has been developed for binding aerogel microspheres to form sheets, blocks, and rods, and this method constitutes the present invention. In accordance with the invention, aerogel composites are formed by mixing aerogel microspheres with a polymer binder, placing the mixture in a mold, and heating under pressure. This compression molding process results in monolithic shapes with densities range from 50–800 kg/m$^3$ (0.05–0.80 g/cc). The thus produced composite aerogel material has use as thermal insulation, as well as filtration, capacitive deionization, energy storage, and ICF targets.

SUMMARY OF THE INVENTION

An object of the present invention is to provide compression molding of aerogel microspheres.

A further object of the invention is a process for forming aerogel composites using compression molding.

A further object of the invention is to provide a process for producing aerogel composites involving compression molding of a mixture of aerogel microspheres or aerogel powder and a polymer binder.

Another object of the invention is to provide a process for binding aerogel microspheres (powder) to form sheets, blocks, and rods.

Another object of the invention is to provide an aerogel composite having a thermal conductivity of below that of air.

Another object of the invention is to provide a compression molding process for producing aerogel composites with densities ranging from 50–800 kg/m$^3$.

Other objects and advantages of the present invention will become apparent from the following description and accompanying drawings. This invention concerns the compression molding of aerogel microspheres (powders) mixed together with a small percentage (up to ~10%) of a polymer binder to form monolithic shapes in a cost effective manner. The resulting aerogel composites are attractive for applications such as thermal insulation, filtration, capacitive deionization, energy storage, and ICF targets. Basically the aerogel composites are formed by mixing aerogel microspheres or powders with a polymer binder, placing the mixture in a mold, and heating (i.e. 100°–175° C.) under pressure (i.e., 1 to 25 psi). This compression molding process results in monolithic shapes and densities in the range of 50–800 kg/m$^3$ (0.05–0.80 g/cc). Using a scanning electron micrograph the composite material contains aerogel microspheres of 1–200µ diameter. Also, the thermal conductivity of the aerogel composites is less than air even with a 10% polymer binder.

BRIEF DESCRIPTION OF THE DRAWINGS

The accompanying drawings, which are incorporated into and form a part of the disclosure, illustrate embodiments of the invention and, together with the description, serve to explain the principles of the invention.

FIGS. 1A, 1B, and 1C are scanning electron micrographs of the composite material made in accordance with the present invention, with FIG. 1A being 40 times magnified, FIG. 1B being 100 times magnified, and FIG. 1C being 1000 times magnified.

DETAILED DESCRIPTION OF THE INVENTION

The present invention involves compression molding of aerogel microspheres for aerogel composites. The method or process of this invention enables binding aerogel microspheres to form sheets, blocks, rods, and other monolithic shapes. The microspheres utilized in the process may be unpyrolyzed or pyrolyzed. The thus produced aerogel composites have thermal conductivity values that approach that of the prior known supercritically-dried aerogel monolith and can be produced in a cost-effective manner, thus eliminating the large and expensive processing equipment necessary for producing reasonably-sized supercritically-dried monolithic aerogels. The aerogel microspheres or powders can be produced in a semi-continuous process, and they can be used as loosely packed powders or as additives in conventional foaming operations to produce aerogel composites with new acoustic and thermal properties. The formation of aerogel microspheres or powders mixed with a polymer binder, and compression molded in accordance with this invention, offers an attractive alternative to monolith production.

An inverse emulsion polymerization was used to produce aerogel particles, referred to herein as microspheres or powders. For example, using a glass reaction kettle, 1 liter of cyclohexane or mineral oil was heated to 50°–70° C. In a separate beaker, a resorcinol-formaldehyde (RF) solution was partially polymerized until it was approaching the gel point. Approximately 250 mL of the RF solution was slowly added to the cyclohexane with agitation. The RF solution was dispersed into spherical droplets throughout the cyclohexane—their size depending upon the agitation rate and the amount of surfactant (e.g., sorbitan monooleate). After the inverse emulsion was heated for 2 to 8 hours, the agitation was stopped and the spherical gel particles were allowed to settle. The cyclohexane was decanted from the reaction kettle and replaced with acetone. The solution was agitated to assist in the solvent exchange of acetone for water inside the gel particles. After sufficient solvent exchanges, the gel particles were supercritically dried from carbon dioxide ($T_c=31°$ C.; $P_c=7.4$ MPa). The resultant microspheres can range in size from micrometers to millimeters depending upon the emulsification procedure. RF, carbon, and melamine-formaldehyde microspheres have been synthesized. A more detailed process for producing the aerogel particles (microspheres or powders) is set forth in above-referenced copending application Ser. No. 08/089,119. While the above-described process for producing aerogel microspheres or powders utilized supercritical drying, an alternate drying method has been recently developed and exemplified by U.S. Pat. No. 5,420,168 issued May 30, 1995 to S. T. Mayer et al.

Figure 1C:

The aerogel composites, in accordance with the present invention, are formed by mixing aerogel microspheres with a polymer binder, placing the mixture in a mold, and heating under pressure. Detailed examples of the process are set forth hereinafter. This compression molding process results in monolithic shapes with densities ranging from 50–800 kg/m$^3$ (0.05–0.80 g/cc). FIGS. 1A, 1B, and 1C show scanning electron micrographs of these aerogel composite materials, with 40, 100, and 1000 magnification being shown in the respective figures. The aerogel microspheres are clearly visible and have diameters of 1–200µ, whereas the polymer binder is difficult to find as a result of the small percentage which is used to hold the structure together. The binder may very from 1% to less than 10% by weight with 7% being the preferred level. Although the aerogel structure within the microspheres cannot be delineated, it is clear that the particles are quite spherical and have smooth surfaces. Tests have shown the pyrolyzed aerogel microspheres are of a smaller diameter than unpyrolyzed microspheres.

Figure 2:
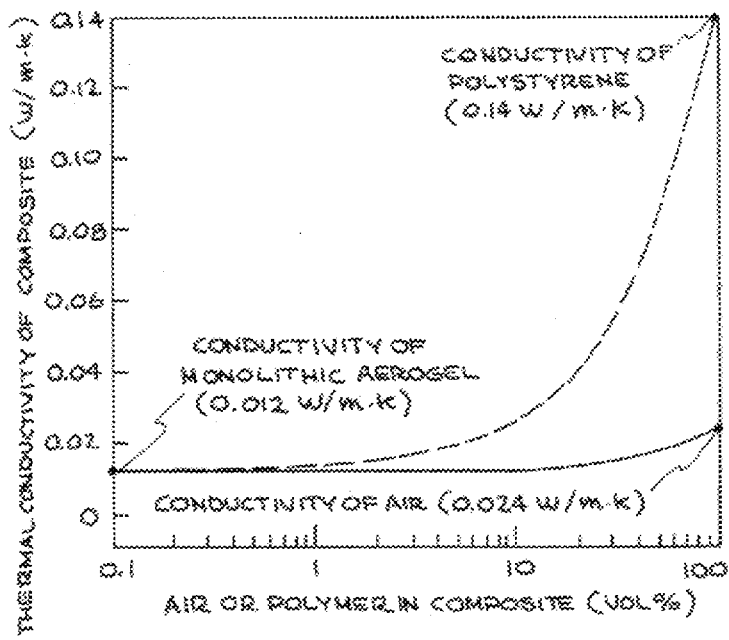
FIG. 2 is a graph showing the thermal conductivity of resorcinol-formaldehyde (RF) microspheres as a function of the volume fraction of interstitial air and polystyrene binder.

These new low-density aerogel composites using microspheres and a polymer binder are attractive due to the thermal conductivity of the composite, which is given by the following equation:

$$\lambda_{total}=\lambda_{aerogel}\phi_{aerogel}+\lambda_{polymer}\phi_{polymer}+\lambda_{air}\phi_{air},$$

where $\lambda$ is the thermal conductivity and $\phi$ is the volume fraction of the respective phases. Because of the gaseous conductivity in the interstitial pores between the aerogel microspheres, a composite aerogel will never achieve as low a thermal conductivity as an aerogel monolith. However, by selecting sphere diameters to achieve maximum packing efficiency, thermal conductivity values can approach that of the aerogel monoliths. FIG. 2 shows the calculated thermal conductivity of RF microspheres as a function of the volume fraction of interstitial air and a polystyrene binder. It is interesting to note that the aerogel composite has a thermal conductivity less than air even with up to 10% polymer binder.

Aerogels are unusual materials in that both the interconnected particles of the solid phase and the interconnected pores of the gas phase have nanometer-sized dimensions. This intricate structure is responsible for the suppression of gaseous conduction and convection, resulting in extremely low thermal-conductivity values.

For the case where the RF microspheres are poured into a cavity in a closed packed arrangement without any polymer binder, a thermal conductivity of 0.015 W/m-K would be expected from the above equation. Recent measurements on loosely packed aerogel microspheres at a bulk density of 0.11 g/cc gave a thermal conductivity of 0.019 W/m-K. This higher than predicted value is a result of the inhomogeneous packing of the RF microspheres. Nevertheless, the thermal conductivity is still below that of air (0.026 W/m-K), and further improvements can be made by selecting spheres of the appropriate diameter to achieve maximum packing efficiency, giving thermal conductivity values that approach that of the supercritically-dried monolith. The same principles apply to the formation of aerogel composites using the compression molding process of the present invention.

The following sets forth three examples for producing aerogel composites utilizing compression molding of aerogel microspheres. While the polymer binder set forth in these examples is a polyvinylidene chloride (PVDC) terpolymer, such as produced by Pierce and Stevens, Buffalo, N.Y. under the Trademark Microlite 126 and which consists of PVDC terpolymer mono-cells containing an encapsulated low boiling hydrocarbon or blowing agent which will expand the thermoplastic terpolymer upon heating, other polymer binders having similar characteristics may be utilized in the process, such as Micropearl F30 and Micropearl F50, produced by Pierce and Stevens, or Expancel 551 produced by Expancel, Marietta, Ga.

EXAMPLE 1

The following materials were blended to form a homogenous mixture:

1.0 g resorcinol-formaldehyde aerogel microspheres (R-150; R/C=200)

0.1 g polyvinylidene chloride terpolymer

This mixture was then placed in a 2.8 cm diameter mold and heated to ~125° C. at ~1 psi for a time period of 1–16 hours. The resultant aerogel composite had good structural integrity and a bulk density of ~190 kg/m$^3$. R/C=[Resorcinol]/[Catalyst] ratio of the starting solution, and R-150 is the reactant concentration in the original sol-gel reaction (i.e., 15% solids).

EXAMPLE 2

The following materials were blended to form a homogenous mixture:

1.0 g carbon aerogel microspheres (R-150; R/C=200; 1050° C.)

0.2 g polyvinylidene chloride terpolymer

This mixture was then placed in a 2.8 cm diameter mold and heated to ~125° C. at ~1 psi for a time period of 1–16 hours. The resultant aerogel composite had good structural integrity and a bulk density of ~140 kg/m$^3$. 1050° C.=pyrolyzing temperature of RF.

EXAMPLE 3

The following materials were blended to form a homogenous mixture:

5.0 g resorcinol-formaldehyde aerogel microspheres (R-150; R/C=200)

0.35 g polyvinylidene chloride terpolymer

This mixture was then placed in a 7.5 cm diameter mold and heated to ~125° C. at ~1 psi for a time period of 1–16 hours. The resultant aerogel composite had good structural integrity and a bulk density of ~150 kg/m$^3$.

EXAMPLE 4

Same process as Example 3, except the resultant RF aerogel composite is subsequently pyrolyzed at 1050° C. for 4 hours under flowing N$_2$ to give a carbon aerogel composite having a density of ~220 kg/m$^3$.

It has thus been shown that the present invention provides an aerogel composite material which has a low thermal conductivity. The aerogel composite is formed by compression molding of aerogel microspheres or carbon aerogel microspheres. Aerogel composites made in accordance with the invention into various monolithic shapes have densities in the range of 50–800 kg/m$^3$ (0.05–0.80 g/cc) and can have thermal conductivities of less than that of air (0.026 W/m·K). Also, the R/C ratio may vary from about 50 to 400. Thus, the composite material has a wide range of applications, including thermal insulation, filtration, capacitive deionization, and energy storage such as capacitors and ICF targets.

While particular examples, materials, parameters, etc. have been set forth to exemplify, illustrate, and describe the principles of the invention, such are not intended to be limiting. Modifications and changes may become apparent to those skilled in the art, and it is intended that the invention be limited only by the scope of the appended claims.

The invention claimed is:

1. A composite material having a density of 50–800 kg/m$^3$, consisting of:

compression bonded organic aerogel microspheres and a polymer binder of about 1% to less than 10% by weight.

2. The composite material of claim 1, wherein said aerogel microspheres are composed of material formed via polycondensation of the group consisting of melamine-formaldehyde, resorcinol-formaldehyde, and phenolic-furfural.

3. The composite material of claim 1, wherein said polymer binder includes polyvinylidene chloride terpolymer.

4. The composite material of claim 1, wherein said polymer binder is composed of a blowing agent in a PVDC shell.

5. The composite material of claim 1, wherein said aerogel microspheres have a diameter in the range of 1–200μ.

6. The composite material of claim 1, having a thermal conductivity of less than 0.026 W/m·K.

7. The composite material of claim 1, wherein said aerogel microspheres are supercritically dried microspheres.

8. The composite material of claim 1, wherein said aerogel microspheres are composed of resorcinol-formaldehyde (RF) aerogel microspheres.

9. The composite material of claim 8, wherein said RF aerogel microspheres have an R/C ratio of 50–400.

10. The composite material of claim 8, wherein said R/C ratio is 200.

11. A method for forming organic aerogel composites, comprising:

providing a quantity of organic aerogel microspheres, providing a polymer binder of about 1% to less than 10%, mixing the microspheres and binder, and compression molding the mixture, thereby forming an organic aerogel composite having a density of 50–800 kg/m$^3$.

12. The method of claim 11, wherein the aerogel microspheres are produced via polycondensation of one of the group of melamine with formaldehyde, resorcinol with formaldehyde, and phenolic with furfural.

13. The method of claim 11, wherein the polymer binding is selected from the group of a blowing agent in a PVDC shell, Micropearl F30, Micropearl F50, and Expancel 551.

14. The method of claim 11, wherein the aerogel microspheres have a diameter in the range of 1–200μ.

15. The method of claim 11, wherein the aerogel microspheres are composed of resorcinol-formaldehyde, and wherein said polymer binder is composed of polyvinylidene chloride terpolymer.

16. A compression molding process for producing organic aerogel composites having a density of 50–800 kg/m$^3$, comprising:

mixing organic aerogel microspheres with a polymer binder, placing the mixture in a mold, and heating to a temperature of 100°–175° C. under a pressure of 1 to 25 psi, for a time period of 1 to 16 hours.

17. The process of claim 16, additionally including forming the aerogel microspheres from material utilizing one of the groups consisting of melamine-formaldehyde, resorcinol-formaldehyde, and phenolic-furfural.

18. The process of claim 16, additionally including providing the polymer binder from the group of polymers including polyvinylidene chloride terpolymer.

19. The process of claim 16, wherein the aerogel microspheres have an R/C=50–400.

20. The process of claim 17, wherein the R/C=200.

21. The process of claim 16, wherein the mixture is prepared using the aerogel microsphere in a weight range of about 1–5 grams, and using the polymer binder in a weight range of about 0.05–0.5 grams.

22. The process of claim 16, wherein the aerogel composite produced thereby has a bulk density of about 50–800 $kg/m^3$.

* * * * *